United States Patent
Orban et al.

(10) Patent No.: US 8,742,643 B2
(45) Date of Patent: Jun. 3, 2014

(54) COMMUTATION SYSTEM FOR A DC MOTOR

(75) Inventors: Jacques Orban, Moscow (RU); Maxim Yurievich Vdovin, Tyumen (RU); Alexey Yurievich Vdovin, Astrakhan (RU); Evgeny Mikhailovich Sviridov, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 222 days.

(21) Appl. No.: 12/991,806

(22) PCT Filed: May 16, 2008

(86) PCT No.: PCT/RU2008/000303
§ 371 (c)(1),
(2), (4) Date: Nov. 9, 2010

(87) PCT Pub. No.: WO2009/139659
PCT Pub. Date: Nov. 19, 2009

(65) Prior Publication Data
US 2012/0001506 A1    Jan. 5, 2012

(51) Int. Cl.
*H02K 13/00*    (2006.01)

(52) U.S. Cl.
USPC ........... 310/237; 310/228; 310/242; 310/245; 310/249

(58) Field of Classification Search
USPC ............. 310/87, 228, 219, 239–253, 256, 89, 310/230–237
See application file for complete search history.

(56) References Cited

U.S. PATENT DOCUMENTS

| | | | | |
|---|---|---|---|---|
| 2,306,028 | A * | 12/1942 | Conradty et al. | 310/236 |
| 3,341,722 | A * | 9/1967 | Hollander, Jr. | 310/64 |
| 3,937,993 | A * | 2/1976 | Noodleman | 310/46 |
| 3,983,432 | A * | 9/1976 | Rankin | 310/242 |
| 4,155,023 | A * | 5/1979 | Hagenlocher et al. | 310/246 |
| 4,223,263 | A * | 9/1980 | Hansen et al. | 322/47 |
| 4,319,153 | A * | 3/1982 | Mabuchi | 310/221 |

(Continued)

FOREIGN PATENT DOCUMENTS

| | | |
|---|---|---|
| FR | 2581260 | 10/1986 |
| JP | 2000166186 A * | 6/2000 |

(Continued)

OTHER PUBLICATIONS

Machine Translation, JP 2000166186 A, Jun. 16, 2000.*

(Continued)

*Primary Examiner* — John K Kim
*Assistant Examiner* — Thomas Truong
(74) *Attorney, Agent, or Firm* — Brandon S. Clark

(57) ABSTRACT

A commutation system for a DC motor having a stator including a plurality of windings and a permanent magnet assembly, the assembly has a housing; at least three collector segments connected to stator windings inside the housing; and a rotor assembly in the housing having brushes for connecting the collector segments, the brushes extending from the rotors parallel to the motor axis; wherein the brushes are attached to the rotors to rotate coaxially to each other and contact the surfaces of the collector segments. The system includes proper mechanism for heat conduction from the brushes sliding surface to the external wall. Damping is provided to limit resonance in the commutation system. Also air filtering can be provided to insure clean operation.

26 Claims, 7 Drawing Sheets

(56) References Cited

U.S. PATENT DOCUMENTS

| | | | |
|---|---|---|---|
| 4,437,029 A * | 3/1984 | Ban et al. | 310/198 |
| 4,551,658 A * | 11/1985 | Rhee | 318/400.11 |
| 4,774,430 A | 9/1988 | Rodriguez et al. | |
| 5,202,599 A * | 4/1993 | Kao | 310/234 |
| 5,237,231 A * | 8/1993 | Blaettner et al. | 310/239 |
| 5,287,032 A * | 2/1994 | Zolda | 310/219 |
| 5,760,518 A * | 6/1998 | Abe et al. | 310/237 |
| 5,905,319 A * | 5/1999 | McLendon | 310/68 R |
| 5,910,259 A * | 6/1999 | Warner | 219/109 |
| 5,949,173 A * | 9/1999 | Wille et al. | 310/220 |
| 5,994,815 A * | 11/1999 | Takagi et al. | 310/237 |
| 6,245,440 B1 | 6/2001 | Kuhlmann-Wilsdorf et al. | 428/611 |
| 6,352,767 B1 * | 3/2002 | Kurokawa | 428/32.72 |
| 6,586,858 B1 | 7/2003 | Finkle | |
| 6,628,036 B1 * | 9/2003 | Lynch et al. | 310/242 |
| 7,034,418 B2 * | 4/2006 | Matsumoto | 310/67 R |
| 7,042,124 B2 * | 5/2006 | Puterbaugh et al. | 310/89 |
| 7,322,103 B2 * | 1/2008 | Burjes et al. | 29/890.035 |
| 2006/0037743 A1 * | 2/2006 | Head | 166/66.4 |
| 2007/0027248 A1 * | 2/2007 | Ebina et al. | 524/445 |
| 2007/0205685 A1 * | 9/2007 | Kuwano et al. | 310/148 |

FOREIGN PATENT DOCUMENTS

| | | |
|---|---|---|
| JP | 2004032969 A * | 1/2004 |
| JP | 2005354828 | 12/2005 |
| RU | 2286642 | 10/2006 |
| WO | WO 2006025444 A1 * | 3/2006 |

OTHER PUBLICATIONS

Machine Translation, JP 2004032969 A, Jan. 29, 2004.*

* cited by examiner

COMMUTATION SYSTEM FOR A DC MOTOR

This invention relates to Submersible DC motor and in particular to a commutation system for a DC motor in a downhole environment.

BACKGROUND ART

Electrical motors are the main means by which electrical energy is changed into mechanical energy. There are several different types of motors in industrial use today, these can general be grouped into two main types, brush-type and brushless motors. DC motors with a magnetic field from permanent magnets typically provides higher torque in comparison with conventional asynchronous AC motors. This is achieved because the magnetizing flux is typically higher. The two magnetic fluxes (rotor and stator) are maintained at 90 degrees from each other to generate the highest torque. In a conventional DC motor with brushes the stator generates the magnetization fluxes: this can be achieved by a permanent magnet. The rotor is the main winding and the mechanical commutation insures proper feeding in the windings by the synchronized rotation of the set of conductive segments in contact with the static power feeding brushes. Typically the copper segments are mounted near the rotor shaft and rotate with the shaft. The copper segments are then connected to the rotor winding. When the rotor moves the current distribution is then performed.

In order to avoid conductive paths being established between the brushes, the gaps between the segments are clean or filled with "varnish or mica insulation. However overtime these gaps can be coated or filled with a thin layer of graphite powder from the brushes which could generate short-circuit between different elements connected at different voltages. As the brushes are generally graphite depending on the application they may typically only operate for a few months before being fully eroded and need replacing.

In mechanical commutation the heat generation in the commutation system will use up a percentage of the motor power. In conventional motors the heat is evacuated by proper contact of the brushes to the chassis of the stator, while the collector is in contact with the shaft so that heat can be moved to the main rotor body and evacuated as the rest of the winding loss in the rotor. Heat can also be partially removed by air flow which is forced axially between the rotor and stator to cool these elements. The air flow also transports carbon and copper dust from the commutation system out of the motor and helps the system stay clean.

The elements of the collector are typically small rectangular segments. This shape is required due to the high number of segments installed on the periphery of the collector. The long axial dimension is beneficial to limit the current density under the brushes when the segment is leaving the brushes, at that moment the winding inductance tends to keep the current at high value while the contact surface is reducing.

In DC brushless motors the main windings are in the stator and the rotor is a rotating permanent magnet. In this type of application the control circuit feed power to the stator winding that the stator magnetic flux is at 90 degrees from the rotor flux. This is achieved due to sensors that continuously track the rotor position.

In another application DC power may be transmitted to the rotor of the machine, in this situation the rotary DC magnetizing flux of such machine is obtained from rotating winding feed with DC current. In this application two brushes are used and each brush is in continuous contact with one solid rotating ring.

Submerged motors are used in various pumping application. One is in the circulating pump of central heating systems for houses and buildings, another use is in the motors for electrical submersible pumps (ESP) used in the oil field. In both cases asynchronous motors are commonly used. With AC systems, particularly 3 phases AC motors, the use of several windings at proper angles generates a rotary magnetic field which interacts with induction flux of the rotor (the flux obtained by a permanent magnet, by field winding, or by self induced current appearing in the rotor (in the squirrel cage)). With the interaction, the rotor is set in rotation. With such a design there is no need for commutation making them suitable for submerged applications.

However the power per unit of volume is reduced compared to a DC motor. These motors require more expensive wiring and more complex systems for speed control.

Therefore it is an object of the invention to provide a new design for a commutation system that is suitable for submerged applications.

DISCLOSURE OF THE INVENTION

Accordingly a first aspect of the invention comprises a commutation system for a DC motor having a stator including a plurality of windings and a permanent magnet assembly, the assembly comprising: a housing; at least three collector segments connected to stator windings inside the housing; and a rotor assembly in the housing having brushes for connecting the collector segments, the brushes extending from the rotors parallel to the motor axis; wherein the brushes are attached to the rotors to rotate coaxially and to contact a surface of the collector segments.

The brushes may also move parallel to the axis of the motor. Preferably the brushes contact the surfaces of the collector segments substantially perpendicular to the axis of rotation of the motor axis.

Preferably in use the collector segments are stationary as the brushes rotate about the axis of the motor. The brushes can also moveable parallel to the axis of the motor.

Preferably brushes of the same polarity are connected to a spring to ensure contact between the brush and a collector segment.

Preferably the collector segments are graphite. The brushes can be made from a copper based material.

The collector segments are connected in equivalent groups and the windings attached to the collector segments are connected in parallel.

In one embodiment the contact surface between the collector segments and the brushes is conical shaped.

The commutation system can further comprise sliding contacts to supply power to the brushes. The sliding contacts can be axially concentric tubular electrodes. The springs axially compress the tubular electrodes against the brushes. The springs can also conduct electrical current to the tubular electrode.

Preferably the space between each contact segment is filled with a wearable isolating material. Preferably the isolating material is a calcareous material. The isolating material is a mixture of talc and set resin. The talc can comprise greater than 55% by weight of the mixture. A lubricating element can also be included in the mixture. Paraffin can be used as the lubricating mixture and comprise more than 55% by weight of the mixture.

The commutation system can further comprise an air cleaning system. The air cleaning system comprises a fan and/or a dust collector.

A commutation system can also comprise friction pads. The pads can act as conductive paths for heat generated by friction from movement of the brushes. Preferably the pads are made from a spring element, a conductive soft deformable material or a combination thereof.

The brushes can be driven by synchronized rotation with the motor drive shaft via a magnetic coupling. In one embodiment the housing of the commutation system is a non-magnetic tube. The external surface of the stainless steel tube can comprise circumferential grooves that extend over the zone of magnetic coupling. Alternatively the tube is formed from non-magnetic lamination plates. The tube comprises a fluid sealing layer covering the inner surface of the tube formed from the lamination plates.

The combination of magnets in the magnetic coupling can ensure the proper orientation of the commutation system after loss of synchronization. The combination of magnets in the magnet coupling can also ensure that that the brushes move axially.

In one configuration the commutation system is located in a housing separate from the motor stator. Preferably the commutation housing is an atmospheric chamber. Alternatively the commutation can operate in an electrically isolative fluid.

In another configuration, the commutation system is located in a chamber comprising an electrically isolative fluid.

Each of the brushes can be made of strands in place of a block of conductive material.

The commutation system can have commutation angles between 120 to 180 degrees. Preferably the commutation angle is between 130 to 150 degrees.

The commutation can further have diodes installed parallel to the collector segments.

A second aspect of the invention comprises an electric motor for use in a submerged application comprising a commutation system as described above.

MODE(S) FOR CARRYING OUT THE INVENTION

The invention is a mechanical commutation system for a DC motor that can be used in submerged applications such as downhole in oilfield applications, i.e. for electrical submersible pumps (ESP).

The system is designed to operate with the motor where the main winding is in the stator and the rotor is a permanent magnet. The advantage of this construction is that it avoids having electrical power feeding into the rotor, which can cause major difficulties for submerged motors, particularly in high pressure fluid.

Figure 1A:
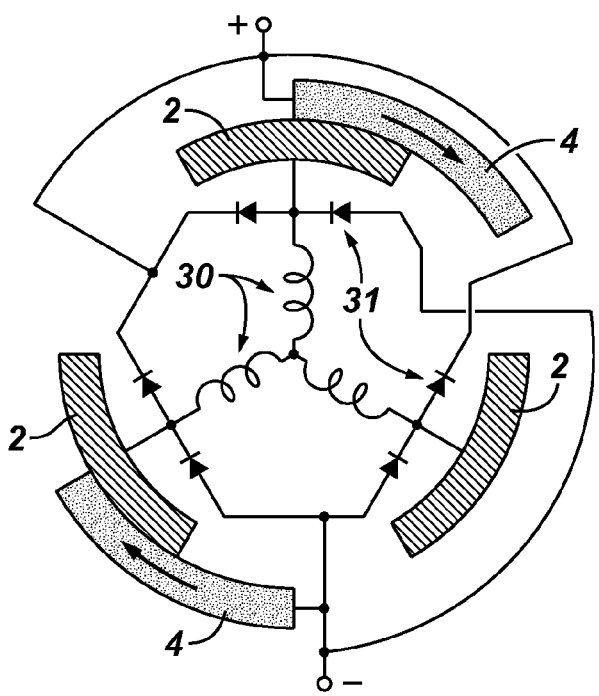
FIG. 1 shows a general electrical view of the commutation system.
Figure 1B:
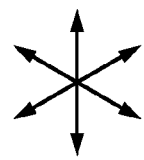

FIG. 1a) shows the electrical basic schematic of one potential design of the proposed system. The stator windings 30 have similar topology as for an AC 3-phase application. These windings 30 are connected to collector segments 2. The brushes 4 are feeding power to the segments 2, the brushes and collector segments contacting each other in a radial direction. The arrow indicates the preferential direction for rotation. In this variant, the rotor may constitute a single pair of north/south magnets. FIG. 1b) indicates the six successive position of the magnetic vector created by the stator.

Figure 2:
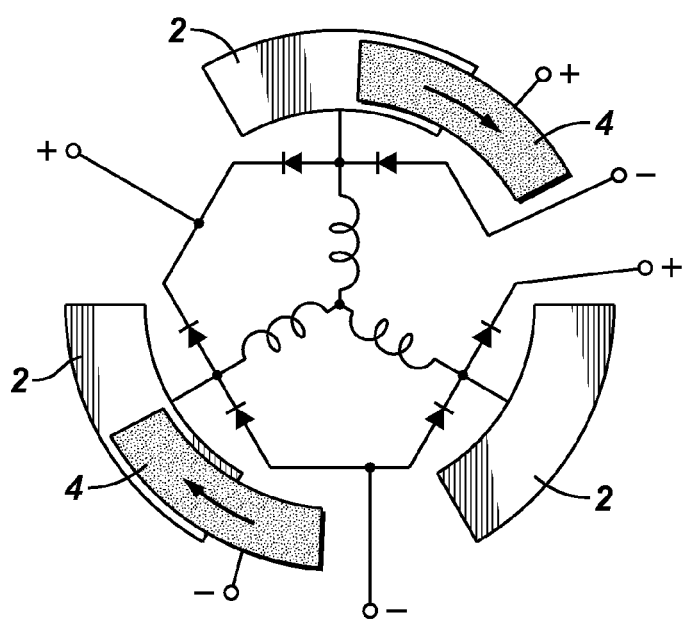
FIG. 2 shows a view of the system with an axial brush system.

FIG. 2 shows the similar application when the brushes 4 and collector segments 2 are contacting each other in axial direction. The two variants shown in FIGS. 1 and 2 have the same electrical functionality.

Figure 3:
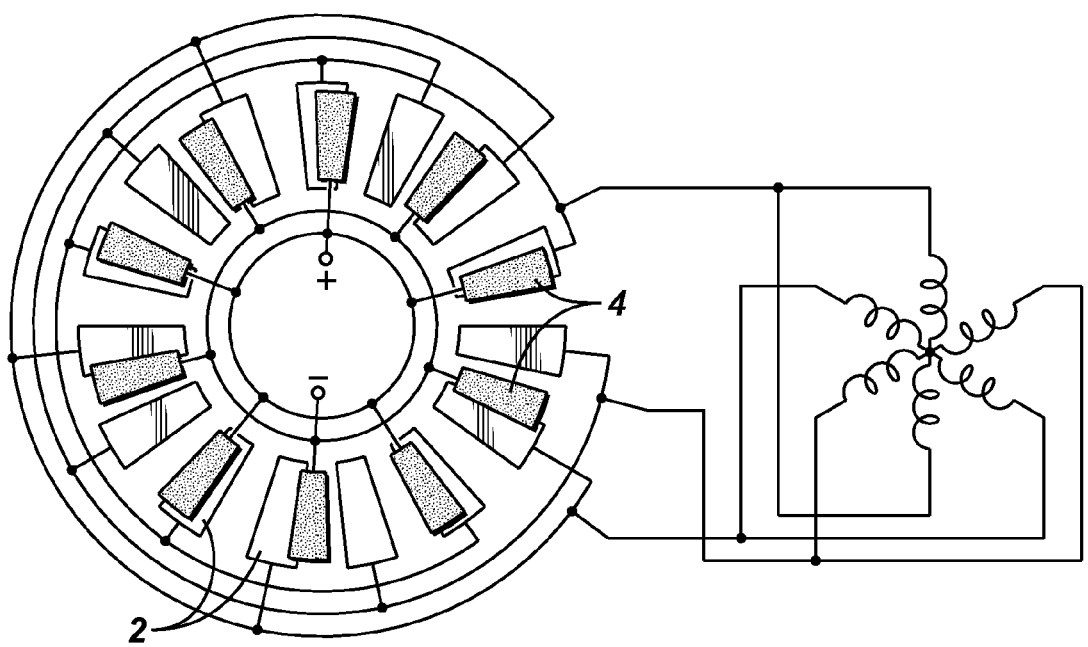
FIG. 3 shows a view of an alternative electrical variant of the commutation system.

FIG. 3 shows another application of a commutation system for a motor with five magnetic pairs on the rotor with the rotor system having five pairs of brushes. It should be noted that the number of collector segments 2 are organized in multiple N of three (one per winding phase), while the brushes 4 are organized in Multiple N of two (one per polarity).

A key element in design of commutation system is to optimize the commutation angle. This is the rotation angle for current conduction in the winding. With the 3-phase type construction, it is well-know that the angle can vary from 120 to 180 degree. The choice of angle is an optimization between torque generation versus peak of current as well as ensuring enough time for limiting the risk of commutation sparking. With a DC brushless motor, the commutation angle may be close to 120 degree. For mechanical commutation, it is vital to have a commutation angle larger than 120 degree to ensure torque for any angle: this is vital to allow start-up in any position. In the preferred embodiment, an electrical commutation angle between 130 to 160 degree is used to operate with highly inductive motor.

Figure 4:
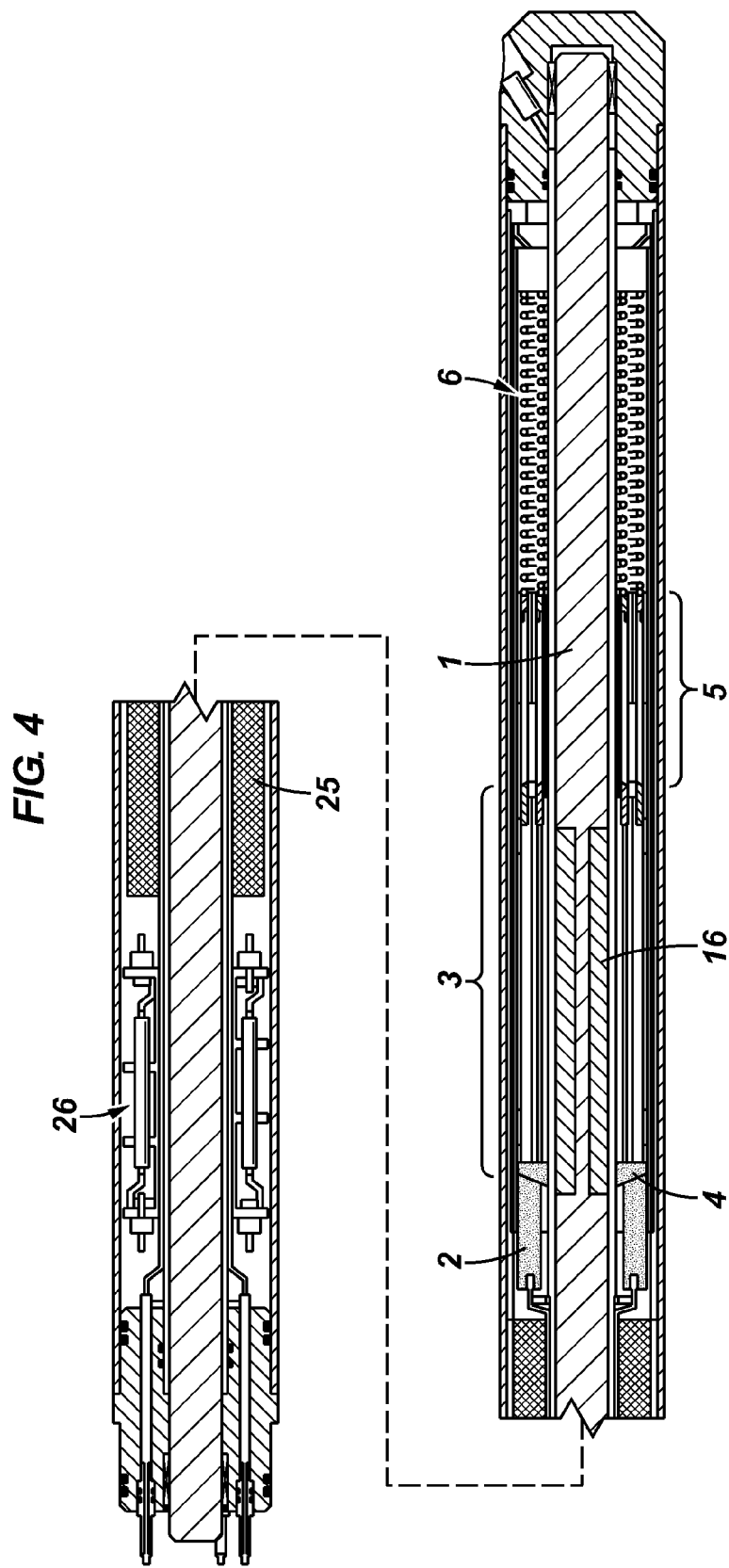
FIG. 4 shows a general view of the commutation system.

FIG. 4 shows a schematic view of the axial mechanical commutation system of a DC motor. The commutation system comprises a housing having an output shaft 1 mounted for rotation inside the shaft. Collector segments 2 are fixed within the housing positioned around the shaft. The rotary distributor 3 having brushes 4 extending from one end are mounted in the housing so that they rotate with the output shaft. Tubular sliding electrodes 5 are positioned in the housing to feed the current to the distributing elements and brushes. Springs 6 ensure proper contact of the sliding elements against the distributing elements. Permanent magnets attached to the output shaft allow the distributor 3 to rotate by magnetic coupling.

Figure 5:
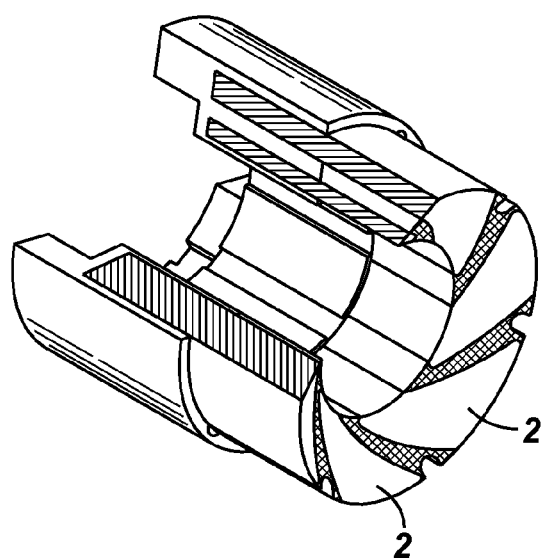
FIGS. 5 and 6 shows view of the static contact segments.
Figure 6:
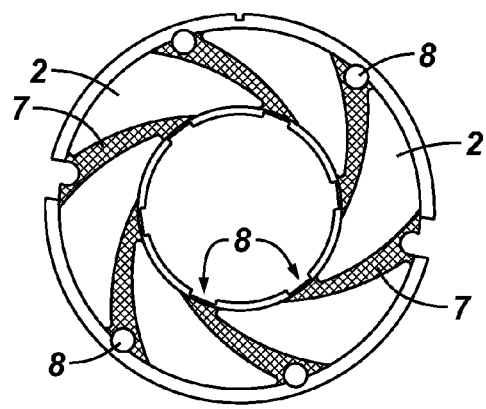

With reference to FIGS. 5 and 6 showing one embodiment of the collector segments, the collector segments are static in the housing. The segments 2 are supported by an isolative support 7 to separate each segment. Each segment is connected to a corresponding stator winding (not shown). Air circulation through the commutation system is helped by apertures 8 present in the collector. The segments of the collector are connected in pairs, i.e. 1 and 4, 2 and 5, 3 and 6. This can occur because the stator windings connected to the pairs are connected in parallel. This means that pairs of brushes for the same polarity do not both have to ensure contact to their respective collector segment. As long as one brush is contacting its segment, the current will be feed into the required winding. This simplifies the mechanical requirement for axial tolerance.

Figure 7:
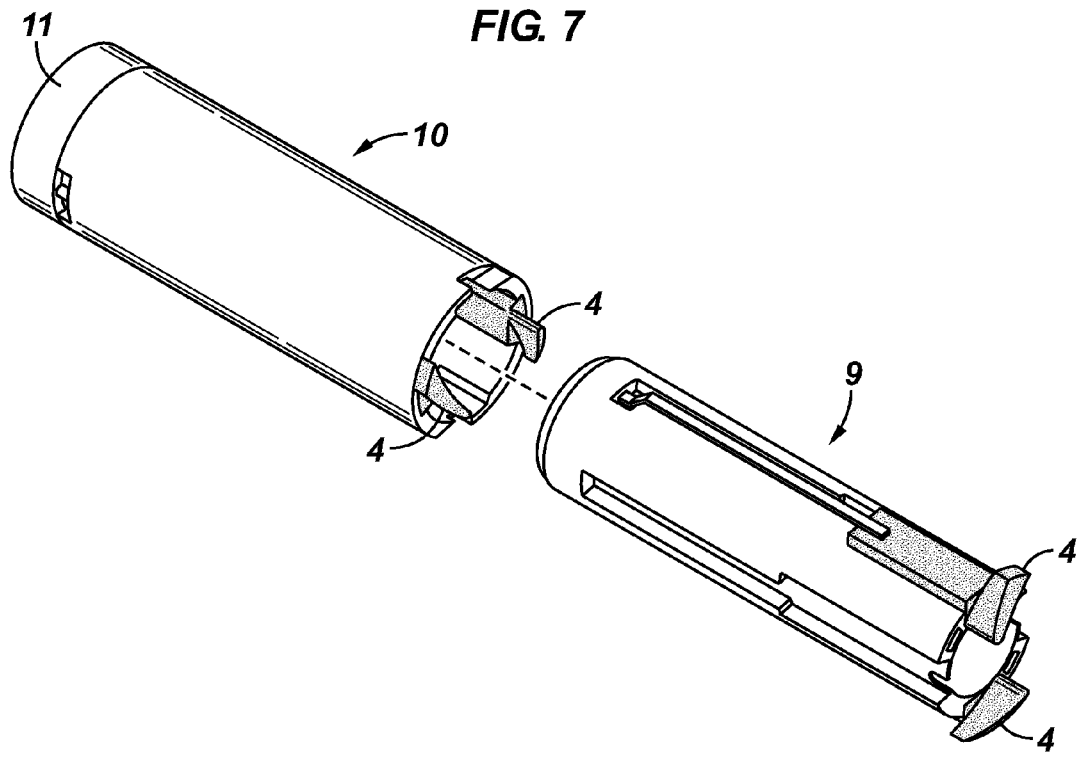
FIGS. 7 and 8 shows views of one embodiment of the brushes and rotating distributor.
Figure 8:
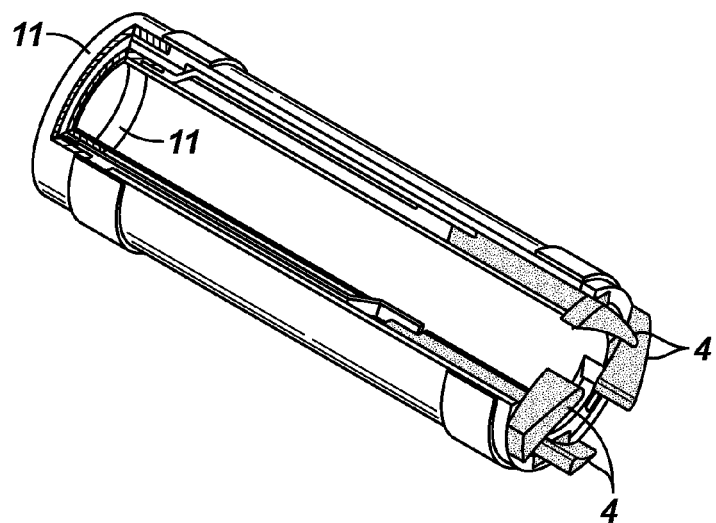
Figure 9:
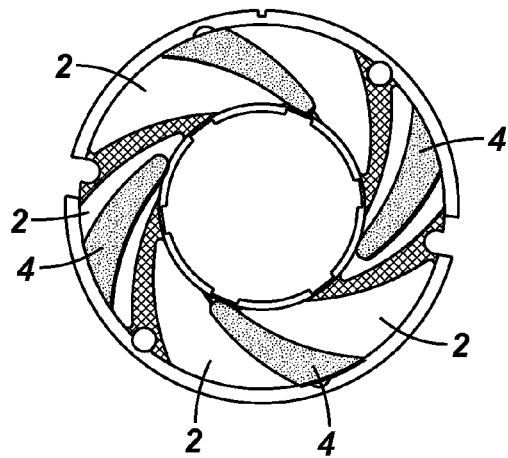
FIG. 9 shows a view of the overlap of contact segments and brushes.

FIGS. 6 and 7 show views of the rotating distributing elements according to an embodiment of the invention. A negative rotor 9 and positive rotor 10 are coaxially supported around the output shaft. Sliding contacts 11 help maintain a continuous electrical link between the brushes and its power supply. The rotors each have brushes 4 that extend longitudinal from the rotors 9, 10 and slide parallel to the axis of motor axis, such that the contacting surface of the brushes 4, which contact the collector segments 2 is perpendicular to the shaft axis (FIG. 8). This differs from conventional configurations where the brushes are in a radial configuration and the contact surfaces of the brushes and the collector segments is parallel to the motor axis.

A limitation concerning the use of electric motors in EPS applications is the limited diameter (OD) available for them to be fitted into downhole equipment. Having brushes that extend longitudinally along the axis of the motor axis rather than radially helps decrease the diameter of the motor. Where a wearable material, such as graphite, is used to form the brushes, long brushes can be used even if the radial space available for the motor is limited as the brushes extend longitudinally. This allows a long operating time without the need to change the graphite elements.

The brushes are submitted to a centrifugal force due to the rotation of the distributor. With the axial design of the brushes, this force does not act in the parallel direction of the spring used to ensure the contact between the brushes and the collector segments. This is important as the typical contact force provided by the spring is in the range of a few kilograms for current in the range of 100 amperes. This force is quite small compared to the centrifugal force generated, and therefore it can be difficult to ensure proper contact force over the range of the motor RPM.

Typically the brushes are graphite and the collector segments are a harder material, however in one embodiment of the invention the collector segments can be graphite and the brushes can be a harder material, such as a copper based metal. This limits the weight and variation of the weight of the rotor, as the erosion will be on the static collector segments and not the brushes. This also allows less displacement of the rotor with time, as the collector segment length variation is less than if conventional graphite brushes are used. This is because for system of the invention the erosion for each segment is only occurring for a fraction of the time, while in conventional commutator constructions graphite brushes are submitted to continuous erosion. With this reduction of displacement, it allows easier construction of the system. In particular the pushing springs have less distance to extend and therefore it is easier to achieve a more uniform pushing force.

In another embodiment of the invention the shape of the collector segments is optimized to ensure a long semi radial overlap between the brushes and the collector segments. When one brush is leaving one segment the residual surface reduces less versus the angular rotation than if the segment has a fully radial edge. This ensure a lower current density in this rotation phase, which can ensure that there is less local heating in the contact area of the electrodes. The electrode edge should make an angle as large as possible with the radius to ensure the maximum edge length. However to avoid extremely thin and fragile electrodes there will be a limit to the angle that can be made. The curved edge of the brushes also allows the brushes to have role as a fan when rotating in the proper direction. This fan effect generates air flow around the system which improves heat exchange by convection.

It is particular preferred that the contact surface of the segments and the brushes is increased by using a conical shape.

The angle of the cone can be wide, but must limited for mechanical construction, such that:
  The edge of the segments does not become to thin and fragile.
  The cones do not start to engage in each other and get "stuck" due to the axial load generated by the pushing spring.

As the distributor of the commutation system has an axisymmetrical design, centrifugal force does not affect the brushes that extend from the distributor elements. In one embodiment the positive and the negative rotors are independent fully rigid blocks which ensure proper contact due to independent central axial loading spring.

In another configuration of the invention the brushes can slide at the periphery of the distributor rotor, while the distributor is axially not moving. Centrifugal force would generate static friction force acting against the axial movement. With the high RPM, centrifugal acceleration up to 500 G (or more) may be present. Then the radial load on the brushes would be in the range of 500 Newton, with friction factor of 0.2, the minimum axial force would be 100 Newton: this is higher that the nominal contact force for the proper operation of the brushes (this force may be less than 50 Newton). Therefore the contact force to the collector would be depending to RPM and to the level of vibration (which would help to break static friction).

Figure 10:
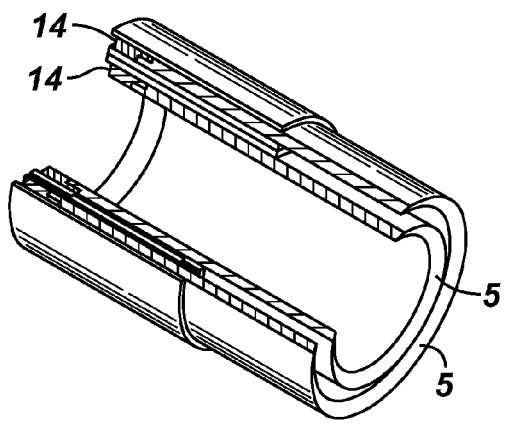
FIG. 10 shows a view of the current feed to the rotating brushes.

With reference to FIG. 10 electrical power can be applied to the brushes of the distributor by using continuous independent sliding contacts 14. The sliding contacts are formed by axial concentric tubular electrodes 5 which slide on rotary concentric sliding contacts on the back of the collector. Contacts 14 are one end of the tubes are in contact with the springs while the other end of the tubes maintain electrical contact with the brushes of the distributor. The tubular electrodes do not rotate but only ensure axial translation to ensure the contact. They tubular electrodes have to be capable to move axially to compensate for contact wear.

Figure 11:
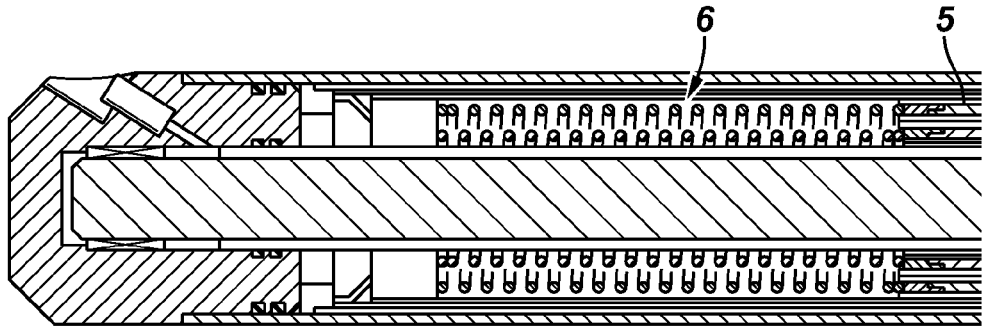
FIG. 11 shows a view of the spring mechanism for the sliding electrodes.

As shown in FIG. 11, axial springs 6 compress the tubular electrodes 5 individually against the corresponding part of the distributor and against the collectors. The springs also conduct the electrical current to the tubular electrode with current being fed into the springs. The springs insure proper contact between the sliding surfaces for minimal electrical resistance.

The motor has to operate with voltage up to 3000 VDC (even up to 4500 VDC). Therefore the mechanical commutation system has to be capable of operating at such high voltage. To allow this the spacing between the none-isolated elements will be several millimeters to avoid arcing across the gap. This applies in particular with all the electrodes and collectors segments. To avoid packing of graphite powder between the segments the gap between collector segments is filled with a material that is highly isolative, easily erodable, so that the contact between the distributor and the collector is made by contact to the graphite segments and not via the gap filling material, is a good thermal conductor, as heat is generated at the sliding contact, and can adapt to the thermal expansion of graphite.

Material that can be used as a filler between the segments includes are:
  Calcareous type material, i.e. chalk as it is easy to erode, not abrasive, a good electrical insulator, and a good thermal conduction.

Plaster of Paris. The plaster of Paris can be mixed with another material, such as clay, to ensure less strength of final product.

A mix of an epoxy product with talc. By adding a lot of talc, the strength of the cast material will be drastically reduced. The ratio talc/epoxy is preferably 80/20% by weight. To reduce friction, it is considered to add some lubricant in the mix, such as paraffin in powder, typically 5 to 10% by weight, of particles of less than 1 mm diameter.

The gap filler can also be used between the erodable lengths of the tubular electrodes. Most of the commutation system surfaces can also be covered with isolative material, such as plastic or ceramic to avoid arcing. Arcing can also be reduced by filling the chamber with inert gas which does not ionized easily, such as $N_2$.

The sliding of the brushes generates erosion. The eroded material is highly conductive as it consists of a fine powder of graphite with small concentration of metallic powder. This conductive powder would typically make thin film over most surfaces, especially if electrostatic forces are in presence at these surfaces.

The commutation system of the invention is contained in a small closed chamber, so that the amount of conductive powder increases with operating time, which increases the risk of arcing and shortage. To avoid this situation, an air cleaning system can be installed in the chamber to collect the conductive powder in this system. Air is circulated in the commutation system by rotary fans. The fan effect is directly obtained by elements of the rotary distributor such as the brushes and the slotted coupling rings to the tubular electrodes. The air is then guided towards the collecting area 25. The dust collectors used can include:

- Large folded surface of porous & permeable material, such as paper filter used for air admission in engines.
- Sponge type material such as that used for air admission in small engine.
- Labyrinth with walls covered by sticky materials to provoke the adhesion of the articles. The adhesion could also be triggered by static electricity.
- A wet filter. The air is passed along surfaces which are wetted by cleaning fluid. The air may also be forced through mist of the wet cleaning agent, as well as passing through a shallow depth trough of such fluid. In this case, the cleaning fluid can be light oil.

In a preferred embodiment of the invention the commutation system is housed in an atmospheric chamber through which the motor drive shaft extends. As the motor is filled with oil, the shaft has to be separated from the atmospheric chamber by an internal housing. Oil is present between the shaft and this internal housing. Magnetic coupling will be used to drive the rotation of the distributor rotor. The magnetic coupling system allows the transmittal of rotation from the shaft to the commutation distributor, without requiring a physical rotary seal, as the shaft is separated from the atmospheric chamber.

The distributor is rotating at high RPM (6000 or even more). As the rotary distributor is not attached to the shaft, proper guidance has to be provided. Using the commutation system of the invention, specific bearings are not required as the sliding contacts for the electrodes play the role of axial and radial bearings:

- For axial force support, the rotary distributor is in compression between both its sliding surfaces as the springs push the static tubular electrodes.
- For radial guidance, the sliding electrode contacts on both sides of the distributor can be conical, insuring the centralization of the rotary distributor.

Extra conventional radial sleeves can be installed in case of high radial displacement of the distributor due to shock.

The combination of functions (contact electrodes and bearings) allows the system to operate without extra sliding surfaces which would generate additional heat generation due to friction. It is important to limit heat generation as the commutation process itself is already a major source of heat.

The motor and the commutation system may be submitted to vibration due to system rotation and to external effects. Axial vibration is a major problem, as it can generate arcing. If the sliding contact is loss, the current would be "pulled" in the air gap due to the high inductance of the motor winding, creating arc in the gap. Also mechanical impact would be generated when the contact is re-established.

With regards to axial vibration as the electrode system (tubular electrode and distributor) has a fair mass, while the spring coefficient is low the natural resonance frequency of the system is low. Therefore it is important to limit potential resonance by damping. This is achieved due to friction on the radial surface of the tubular electrode as well as on the distributor rotor. Friction pads can be added at the periphery of the system. These pads ensure vibration damping of the sliding components in view of having non-interrupted electrical power feeding in some electrodes. The pads can be made of spring elements or heat conductive soft elements (such as special rubber). The pads may also be used to increase heat transfers from the sliding surface of the brushes to the external housing of the system. Furthermore the spring can slide along a surface covered by hairy skin inclined towards to the electrodes. This allows the spring system to move and extend only in one direction, which compensates for the graphite erosion and with this one way movement, resonance can not be established.

Radial vibration can be also an issue if conical surface is used. The radial force on the distributor acts to separate axially the electrode systems due to the cone. However due to the plurality of brushes, this does not effect commutation, as at least one contact will stay engaged per polarity.

However under the presence of radial force onto the distributor rotor, stresses are generated onto the graphite elements. This radial load generates tensile tangential stresses in graphite in tubular electrodes as well as bending in the segments, inducing risk of graphite breakage. To limit the risk of breakage the cone angle needs to be limited, so that the distributor pushes slightly the tubular electrode backwards and then move against the "safety radial bearings".

- At 6000 RPM, 1 gram out of balance on the distributor periphery can then generate radial force in the range of a few kilograms. With proper cone angle, several grams of "out of balance" are required before pulling the rotor on the side to balance the axial spring force.
- With general motor radial vibration in the range up to 5 G, the whole mass of the rotor would then generate radial force onto the cone of the bearing. It the combined spring force is 10 kilograms and the cone angles are 45 degree, the distributor total mass should not be higher than 2 kg to avoid radial displacement of the rotor against the radial bearing.
- Under radial shock due to motor handling by crane, the distributor rotor will be move up to the radial bearing.

Therefore the electrical current distribution operates properly without being affected by effects of out-of-balance mass and with motor radial vibration.

Magnetic coupling drives the rotation of the distributor. The motor shaft is in pressurized oil, while the commutation system operates in an atmospheric chamber. They are separated by the internal housing however the wall of the internal housing must be non-magnetic to allow penetration of the magnetic flux between the motor shaft and the distributor. The wall should also limit the appearance of eddy currents to limit heating. To achieve this, a composite material, such as fiber glass with special resin can be used to form the wall.

Figure 12:
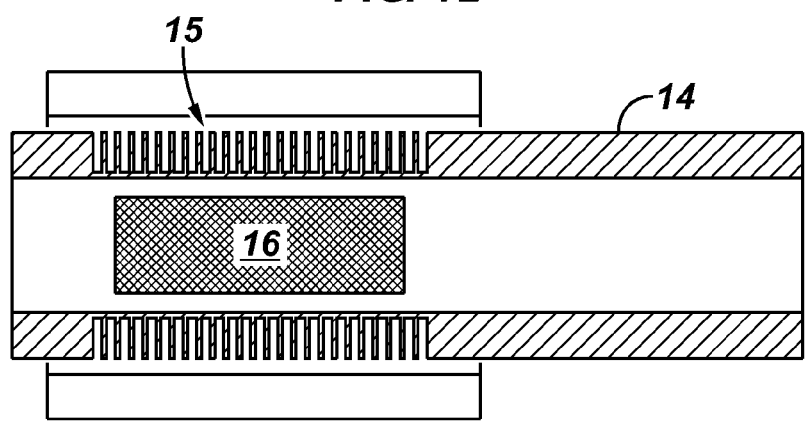
FIGS. 12 and 13 shows possible designs for the housing to allow magnetic coupling.

In one approach the wall of the housing can be made of a composite material, for example fiber glass with an epoxy resin. In another embodiment the wall could be made of a thin non-magnetic metal tube 14, such as stainless steel, which is for example less than 2 mm for a diameter typically more than 20 mm, as shown in FIG. 12. Over the zone of magnetic coupling, deep circumferential thin grooves 15 are cut in the tube 14 from the external side. The grooves are typically 0.5 to 1 mm apart and their width should be as narrow as possible and may be as small as 0.1 mm. The depth of the grooves in the tube are such that only a small amount of metal is still present at the bottom of the groove i.e. 0.5 mm is not cut. With such a series of circumferential cuts, the tube is nearly a stack of none-magnetic lamination plates. As it is non-magnetic, as the magnet 16 rotates magnetic flux can be transmitted across the wall. While rotating, the "stack of lamination" limits the appearance of eddy current as in a typical motor starter construction. As the deep grooves do not passes entirely through the thickness of the tube, the seal is not loss and the oil cannot penetrate into the commutation chamber. As a mechanical construction, a single spiral groove in the metallic nonemagnetic material over the length where magnetic flux is transmitted can insures the same benefits.

Figure 13:
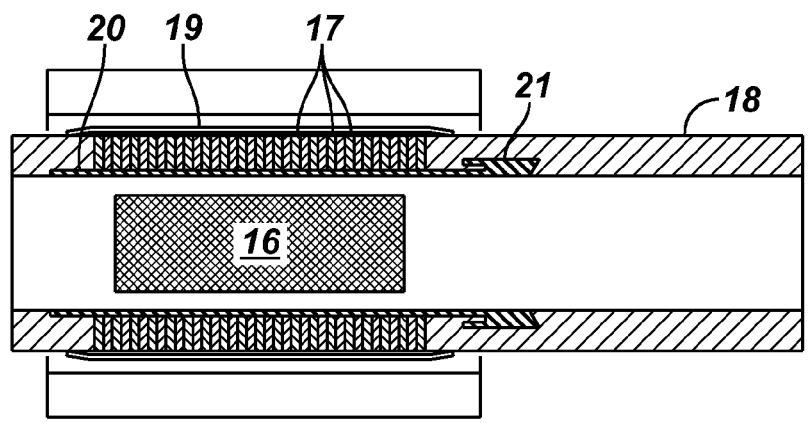

In an alternative construction the tube can be locally made as a stack of non-magnetic lamination plates 17 as shown in FIG. 13. These plates are compressed axially to form part of the tube 18, due to axial pull bars 19. The stack allows rotary magnetic coupling. However, as it is a series of plates it does not ensure fluid sealing. Therefore a thin sealing layer 20 is added on the side of the pressurized fluid. This layer can be a thin metal tube or a layer of plastic or rubber. The purpose of the thin layer is to provide a sealing layer. The stress induced by the pressure will be supported by the lamination as tangential stress.

If rubber is used as the sealing layer a lip 21 for the rubber can be present so that the sealing can be achieved as rubber typically has a tendency to retract when molded in a bore. The lips can be used on both ends of the rubber layer.

The magnetic coupling allows axial movement of the distributor in the commutation chamber while the shaft stays at its predefined axial position. This can occur due to the use of magnets on both parts which are polarized in a radial direction. The magnetic coupling is designed with a sufficient number of magnets so that if the distributor is suddenly desolidarized angularly from the shaft magnet, the distributor will be re-position property.

For example with a four poles motor rotor with six windings, two set of magnets are used, so that the rotor would be in correct position for every 180 degree. This ensures that the motor would still function after a potential loss of angular position.

The commutation system needs accurate angular orientation versus the stator winding. For a long motor, this can be difficult to achieve, due to the number of mechanical elements affecting the proper angular orientation and can be a particular problem if the commutation system is mounted in separated housing form the motor stator.

To achieve accurate angular orientation side-shimming of the magnet on the drive shaft to change the position of the magnet versus the shaft axis can occur. This is the preferred method, as being low cost and extremely reliable. Typically a thin non-magnetic tube will slip over the assembly.

The commutation system can generate a fair amount of heat. Some of the heat is generated by high speed friction between the distributor and the graphite elements. Heat is also generated at the distribution brushes due to sparks and high current density when the brushes leave the segments.

A number of configurations can be used to limit temperature during operation of the system.

Cooling by conduction for all critical elements. The collector is coupled to the external housing for direct heat transfer to the fluid outside the motor. The collector body can be done in castable ceramic.

Additional cooling by forced convection, as the rotary electrodes on the distributor act as fans. Windows may be open in the plastic insulator and the housing to increase heat exchange by forced convection.

Adding lubricating agent to reduce sliding friction (and heat generation) at high speed rotation. This can be achieved by adding lubricating agent in the composite material between none-rotary electrodes (paraffin in epoxy/talc mixture for example). Another method can comprise introducing vapor of lubricating agent into the atmosphere. This can be achieved by wicking effect in the proper lubricating liquid at the bottom of the commutation chamber, or example light oil or diesel.

Reduction of spring force to limit friction.

Use of special gas if atmospheric chamber:
$N_2$, for retarding appearance of spark
He for improved heat transfer by convection
No oxygen to avoid fire with carbon at high temperature
Introduce vapor into the atmosphere to increase drastically the thermal characteristic of the atmosphere (again via the wicking effect). This increases the heat transfer by forced convection.

Figure 14:
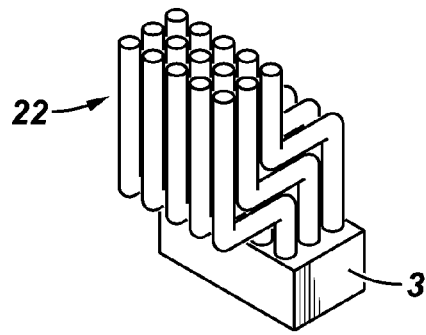
FIG. 14 shows one possible design for the brushes.

The commutation system can also be used to operate directly in oil. This allows the system to operate without magnetic coupling. In this situation the brushes are optimized to avoid generating a fluid film in the contact area between the brushes and the contact segment. The brushes are also designed to avoid differential sticking during long stop periods. The brushes can be made from porous conductive material, stacks of layers with grooves parallel to the brush's axis or may be stranded brushes as shown in FIG. 14. The brushes (shown as 4 in FIG. 7) are made of strands 22. The brushes are connected at one end to the rotating distributor 3 and extend axially to contact the contact segments 2 connected to the stator windings.

Figure 15:
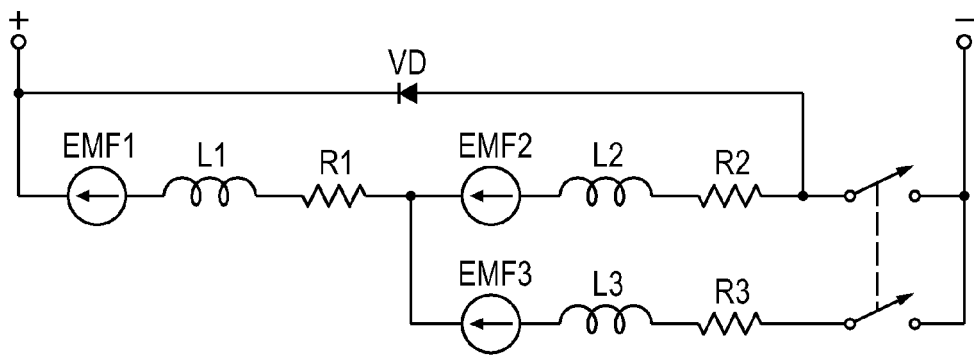
FIG. 15 shows the equivalent circuit of the spark limiting system.
Figure 16:
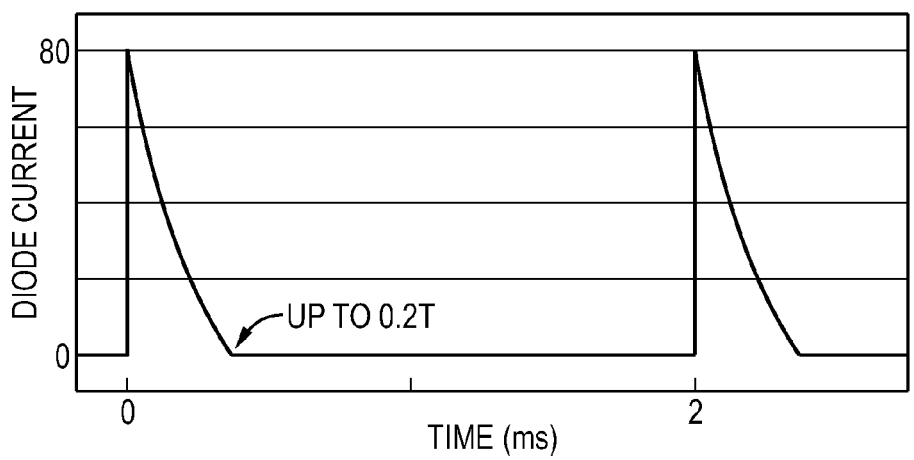
FIG. 16 shows the current occurring across the spark suppressing diode.

A further aspect of the invention is the ability to limit the production of sparks during commutation, as such the commutation system can also comprise an electrical spark suppressor 26. Diodes can be installed in parallel to the collector segments, to provide a similar function as a back-diode in a motor inverter. Sparks may typically be generated by overvoltage between segments and brushes during commutation (current breaking transition) due to self-induction EMF in reactive load (motor windings). The sliding contacts comprised of brushes and collector segments are shunted by the antiparallel diodes that are connected in the following way: diodes of anode group are connected together with their anodes and feeding negative pole while their cathodes are connected with each phase of motor winding; diodes of cathode group are connected together with their cathodes and feeding positive pole while their anodes are connected with each phase of motor winding. As shown in FIG. 1, FIG. 2 and FIG. 3, a set of diodes 31 is installed to shunt the reactive load (motor windings). The equivalent circuitry of the motor during switching is shown in FIG. 15, where the three windings are represented by the resistance R, inductance L and back-electromotive force (EMF); only the active diode for the analyzed transition is being represented. FIG. 16 shows the typical current in the diode. During over-voltage on the mechanical switching elements, the back diode conducts and current in commutated winding is rapidly damped. This also limits the voltage rise avoiding arc generation. This method is commonly used in DC brushless application, by installing a back diode in parallel with insulated gate bi-polar transistor (IGBT) switches of the inverter.

The commutation system is described with reference to its use as part of a motor for powering electrical submersible pumps of the type use for the production of hydrocarbons from well. However the commutation can be used in other downhole tools and in applications outside the oilfield industry.

The invention claimed is:

1. A commutation system for a DC motor having a stator including a plurality of windings and a permanent magnet assembly, the assembly comprising:
   a housing;
   at least three collector segments connected to stator windings inside the housing;
   a rotor assembly in the housing including a rotor having a rotary distributor with brushes for connecting the collector segments, the brushes extending from the rotor parallel to a motor rotation axis; wherein the brushes are attached to the rotor to rotate coaxially therewith and to contact a surface of the collector segments, wherein the commutation system has commutation angles between 120 to 180 degrees and contact surfaces of the brushes and the collector segments lie substantially perpendicular to the motor rotation axis;
   a spring disposed in the housing;
   a plurality of tubular sliding electrodes positioned between the spring and the rotary distributor, the spring acting in an axial direction against the plurality of tubular electrodes to maintain contact between the contact surfaces of the brushes and the collector segments; and
   a plurality of apertures extending along the at least three collector segments to facilitate air circulation.

2. A commutation system according to claim 1, wherein the brushes are moveable parallel to the axis of the motor.

3. A commutation system according to claim 1, wherein the collector segments are stationary and the brushes are arranged to rotate about the axis of the motor.

4. A commutation system according to claim 1, wherein the brushes of a same polarity are connected to a spring to ensure contact between the brush and a collector segment.

5. A commutation system according to claim 1, wherein the collector segments are graphite.

6. A commutation system according to claim 1, wherein the brushes are made from a copper based material.

7. A commutation system according to claim 1, wherein the collector segments are connected in equivalent group and the windings attached to the collector segments are connected in parallel.

8. A commutation system according to claim 1, further comprising spaces between collector segments filled with a wearable isolating material.

9. A commutation system according to claim 8, wherein the isolating material is a calcareous material.

10. A commutation system according to claim 8, wherein the isolating material is a mixture of talc and set resin.

11. A commutation system according to claim 10, wherein the talc is greater than 55% by weight of the mixture.

12. A commutation system according to claim 10, wherein a lubricating element is included in the set mixture.

13. A commutation system according to claim 12, wherein the lubricating agent is paraffin comprising greater than 55% by weight of mixture.

14. A commutation system according to claim 1, wherein the brushes are driven in synchronized rotation with a motor drive shaft via a magnetic coupling.

15. A commutation system according to claim 14, wherein the housing is a non-magnetic metal tube.

16. A commutation system according to claim 15, wherein the non-magnetic metal tube is formed from non-magnetic lamination plates.

17. A commutation system according to claim 16, wherein the tube comprises a fluid sealing layer covering the inner surface of the tube formed from the lamination plates.

18. A commutation system according to claim 14, wherein a combination of magnets in the magnetic coupling ensures reorientation of the commutation system after any loss of synchronization.

19. A commutation system according to claim 1, wherein the commutation system is located in a housing separate from the motor stator.

20. A commutation system according to claim 1, wherein the housing is an atmospheric chamber.

21. A commutation system according to claim 1, wherein the commutation system is located in a chamber comprising an electrically isolative fluid.

22. A commutation system according to claim 1, wherein the brushes are stranded brushes.

23. A commutation system according to claim 1, wherein the commutation angle is between 130 to 150 degrees.

24. A commutation system according to claim 1 wherein diodes are installed in parallel to the collector segments.

25. A commutation system for a DC motor having a stator including a plurality of windings and a permanent magnet assembly, the assembly comprising:
   a housing;
   at least three collector segments connected to stator windings inside the housing;
   a rotor assembly in the housing including a rotary distributor with brushes for sliding contact with the collector segments, the brushes extending from the rotor parallel to a motor axis; wherein the brushes are attached to the rotary distributor to rotate coaxially therewith and to contact a surface of the collector segments, wherein the contact surfaces of the brushes and the collector segments lie substantially perpendicular to the motor rotation axis;
   a tubular sliding electrode positioned in the housing to feed current to the rotary distributor and the brushes; and
   a spring acting against the tubular sliding electrode in a direction parallel with the motor rotation axis to ensure proper contact between the tubular sliding electrode and the rotary distributor as well as between the contact surfaces of the brushes and the collector segments.

26. A commutation system for a DC motor having a stator including a plurality of windings and a permanent magnet assembly, the assembly comprising:
   a housing formed of a composite material;
   at least three collector segments connected to stator windings inside the housing;

a rotor assembly in the housing including a rotor having a distributor with brushes for connecting the collector segments, the brushes extending from the rotor parallel to a motor axis; wherein the brushes are attached to the rotor to rotate coaxially therewith and to contact a surface of the collector segments, wherein the contact surface between the collector segments and the brushes is conical shaped and nonparallel with respect to the motor axis;

a spring positioned in the housing and oriented to ensure contact between the brushes and the collector segments, the spring further being oriented such that a centrifugal force due to rotation of the rotor and its distributor does not act in a parallel direction of the spring; and an electrode between the spring and the distributor, the spring conducting electrical current to the electrode.

* * * * *